April 16, 1968 W. C. ANDERSON 3,378,833

ANALOG-DIGITAL CONVERTER EMPLOYING A RING DEMODULATOR

Filed July 9, 1964

INVENTOR.
WILMER C. ANDERSON

BY Louis Altman

ATTORNEY

United States Patent Office 3,378,833 Patented Apr. 16, 1968

3,378,833

ANALOG-DIGITAL CONVERTER EMPLOYING A RING DEMODULATOR

Wilmer C. Anderson, Greenwich, Conn., assignor to General Time Corporation, New York, N.Y., a corporation of Delaware Filed July 9, 1964, Ser. No. 381,330
10 Claims. (Cl. 340—347)

ABSTRACT OF THE DISCLOSURE

The analog-digital converter of this invention includes a reference oscillator operating at a fixed frequency, and another oscillator operating at a frequency which is varied as a function of the analog input signal. The output signals of the two oscillators are beat together in a ring demodulator circuit to produce an output signal including a frequency equal to the difference between the variable oscillator frequency and the fixed oscillator frequency. The numerical output indication is provided by counting the number of cycles of the difference frequency occurring within a measured time interval. An adjustable phase shifter is provided to control the relative phase of the oscillator output signals, to eliminate a spurious output signal indication which might otherwise occur. The bridge output signal is passed through a low frequency filter, tunable to select only the fundamental frequency, and is then shaped into a rectangular wave form prior to application to a read-out device.

Figure 1:
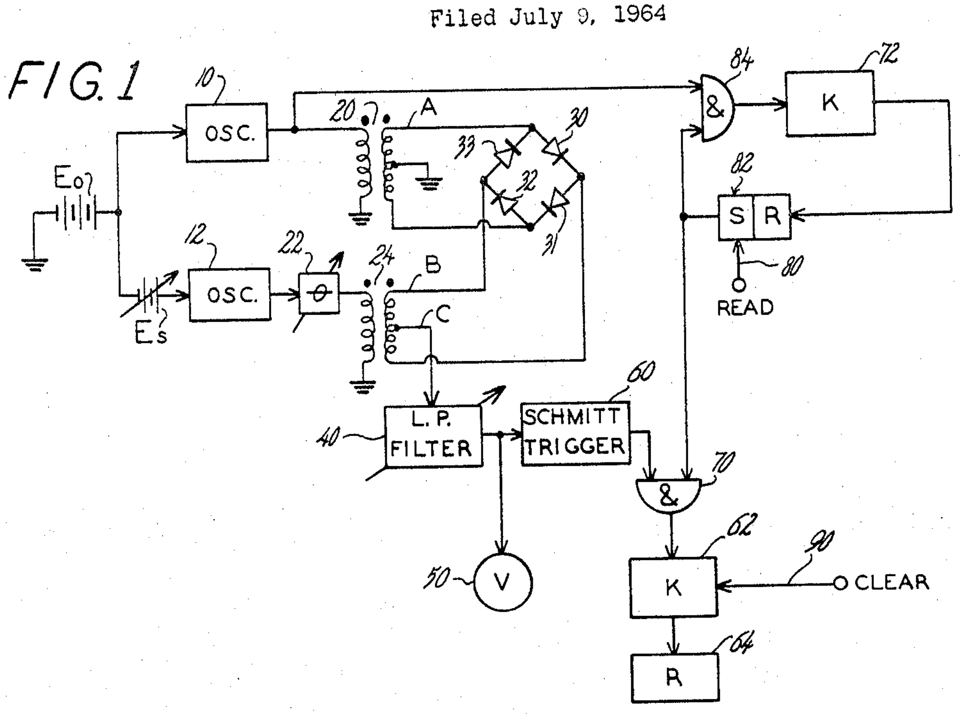

This invention relates generally to analog-digital conversion, and particularly to the type of analog-digital converter in which voltage-controlled oscillators are employed to generate frequencies that numerically represent the value of an analog variable voltage.

In the past, numerical representations of analog quantities have been derived by representing the analog variable as a voltage proportional thereto, and using this voltage to control the frequency of a voltage-sensitive oscillator. The frequency of this oscillator, which is thus a numerical representation of the original analog variable, is determined by comparing it with the frequency of a reference oscillator. One known way of effecting such a frequency comparison was by means of a pair of counters counting the number of cycles produced within a fixed interval of time by the reference oscillator and the variable oscillator respectively, as taught in U.S. Patent No. 2,672,284 of Dickinson. The disadvantage of this earlier approach is that the required counters represent complex and expensive circuitry, and in addition the Dickinson patent mentioned above did not teach any way to measure the analog voltage relative to any reference point other than zero. To measure the variable voltage relative to some reference point greater than zero requires a subtraction operation to derive the difference between the frequencies of the two oscillators, and in turn requires considerable counting and gating circuitry which further increases the complexity and cost.

Other previously known means of extracting a difference between the frequencies of the variable oscillator and the reference oscillator have involved the use of such expedients as vacuum tube mixers, transformer adders, flip-flops, and relays.

In accordance with the present invention, this operation is performed more simply and inexpensively by the use of a diode bridge ring demodulator. Accordingly, the objects and advantages of this invention include extreme simplicity and low cost resulting from the use of a simple junction diode bridge in place of the prior art expedients mentioned above. Also, the diode bridge of this invention is longer lived and more trouble-free than prior circuitry. Additional advantages of the invention include great accuracy and a very wide operating range.

Briefly summarized, the analog-digital converter of this invention comprises a reference oscillator operating at a reference frequency, and another oscillator operating at a frequency which varies as a function of the value of a selected variable quantity. A ring demodulator circuit is connected to both of the oscillators to produce an output comprising a frequency equal to the difference between the variable oscillator frequency and the reference oscillator frequency. The numerical output indication is provided by means which count the number of cycles of the difference frequency occurring within a measured time interval.

Figure 2:
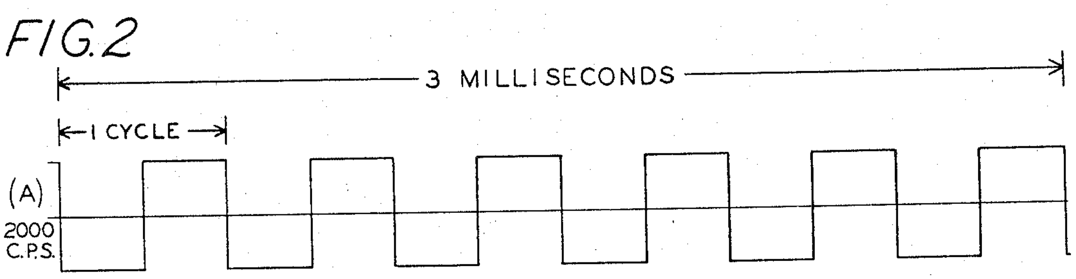
Figure 3:
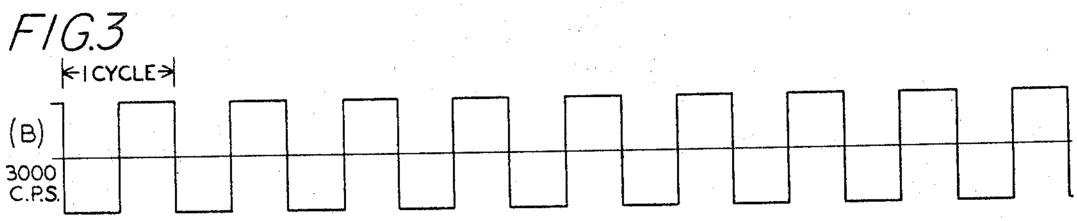
Figure 4:
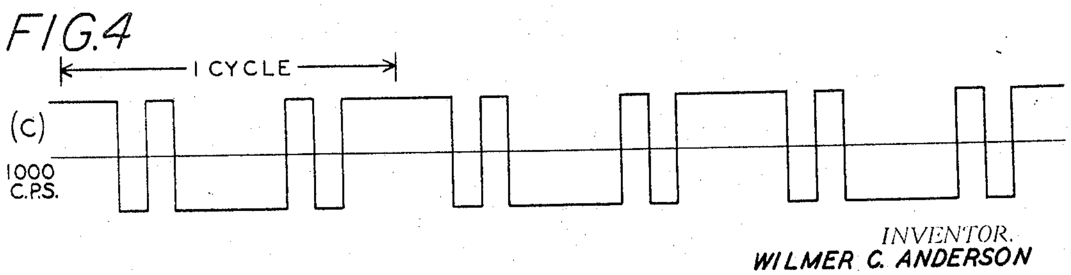

The invention will now be described in greater detail by reference to the following drawings:

FIG. 1 is a schematic circuit and block diagram of the analog-digital converter of this invention; and FIG. 2 is a pulse diagram illustrating the manner in which the ring demodulator circuit included in this invention extracts the difference frequency between two drive frequencies applied thereto.

In the circuit of FIG. 1 oscillators 10 and 12 may be any known type of voltage-controlled oscillator; i.e. an oscillator which varies its operating frequency as a function of its supply voltage. Many such oscillators are well-known to those skilled in the art. As a specific example, however, the oscillators 10 and 12 may be free-running magnetic multivibrators of the type disclosed in U.S. patent application, Ser. No. 210,410, "Magnetic Oscillator," filed July 17, 1962, which has the assignee and one inventor in common with this case.

It is well known that magnetic multivibrators vary their operating frequency as a function of ambient temperature and supply voltage. It is one of the advantages of this invention that the numerical indication provided by this analog-digital system depends upon the difference between the frequencies of oscillator 10 and oscillator 12. Therefore, if oscillators 10 and 12 are both at the same location they will be subject to the same ambient temperature conditions and therefore will be similarly affected by temperature changes. Also, both oscillators 10 and 12 are primarily powered by the same voltage source $E_0$. Hence fluctuations in the value of $E_0$ also will affect both oscillators similarly. In either case, an increase in the frequency of both oscillators, or a decrease in the frequency of both oscillators, will not be reflected in the difference between the oscillator frequencies and therefore will not affect the numerical output of the analog-digital converter system.

It is the voltage-sensitivity of the oscillators 10 and 12 which is exploited here for the purpose of rendering a numerical indication of the analog value of a variable voltage. Oscillator 10 is a reference oscillator which is supplied by a fixed reference voltage $E_0$. Oscillator 12, on the other hand, is a variable oscillator which is powered by the algebraic sum of the fixed reference voltage $E_0$ and a variable signal voltage $E_s$ in series therewith. The two voltages can be connected either in series aiding or series opposing relationship. Assuming a series aiding relationship, the operating frequency of the variable oscillator 12 will exceed the frequency of the reference oscillator 10 by an amount which is proportional to the extra increment of supply voltage $E_s$ applied to the variable oscillator 12. In other words, the difference between the variable frequency of oscillator 12 and the reference frequency of oscillator 10 is proportional to the analog voltage $E_s$.

If the analog-digital conversion system of this invention is employed in a digital voltmeter, then $E_s$ would represent the unknown voltage to be measured. Alternatively, $E_s$ could be a voltage which represents any other variable quantity which it is desired to measure with the analog-digital converter of this invention. The variation of the difference frequency as a function of the analog signal $E_s$ is quite linear, especially if the oscillators 10 and 12 are magnetic multivibrators of the type mentioned above, and especially if the range of operation is not unduly large.

The output of the reference oscillator 10 is applied across the primary of a first transformer 20. The output of the variable oscillator 12 is applied through a variable phase shift circuit 22 across the primary of another transformer 24. The secondaries of both transformers 20 and 24 are connected across a bridge circuit containing diodes 30 through 33. The bridge circuit 30 through 33 is preferably balanced, i.e. diode 30 has the same forward impedance as diode 31, and diode 32 has the same forward impedance as diode 33. The diode bridge is connected not in the usual full-wave rectifier configuration in which one pair of diodes is poled oppositely to the other pair of diodes, but in a ring configuration wherein all four diodes 30 through 33 are poled in the same direction around the ring or bridge circuit. A pair of center taps are connected to the respective secondaries of transformers 20 and 24.

This circuit is essentially the previously known ring modulator circuit, a description of which may be seen on pages 169 and 170 of "Transistor Circuit Design," prepared by the engineering staff of Texas Instruments, Inc., and published by McGraw-Hill Book Company, Inc. of New York, N.Y., in 1963. In that circuit, a square wave input is applied to the primary of a first one of the transformers. A second input, which may also be a square wave, is applied across the center taps of both transformers. The output is then taken from the second one of the transformers. If the frequency applied to the first transformer is $f_1$, and the frequency applied to the center taps is $f_2$, then the output taken across the second transformer will be $f_1$ plus $f_2$ and $f_1$ minus $f_2$. Thus, the circuit is seen to function in this way as a modulator in that it takes a carrier frequency $f_1$ and generates upper and lower side bands $f_1$ plus $f_2$ and $f_1$ minus $f_2$.

In the circuit of this invention, the ring modulator described above is driven in reverse so as to function as a demodulator. Here the carrier frequency $f_1$ is applied to the first transformer 20, and the upper side band frequency $f_1$ plus $f_2$ is applied to the second transformer 24, and the two input frequencies are beat together in the ring circuit 30 through 33. The output is taken across the two secondary center taps, and comprises the difference frequency $f_2$ plus certain other higher frequency components which may be filtered out by a low pass filter 40.

Thus, this ring demodulator circuit provides an extremely simple and inexpensive means for extracting an output the fundamental frequency of which is equal to the difference between the reference frequency of oscillator 10 and the variable frequency of oscillator 12. The reference frequency is regarded as $f_1$, and is applied to transformer 20. The variable frequency is greater than the reference frequency, and therefore may be regarded as $f_1$ plus $f_2$. Then $f_2$ is the difference frequency to be extracted, this being the frequency proportional to the unknown signal voltage $E_S$ which is to be measured. Thus, the difference frequency is derived as an output across the two secondary center taps of transformer 20 and 24 when the two inputs are beat together in the bridge circuit 30 through 33. The center tap on the secondary of transformer 20 is grounded, so that the full output voltage is available at the center tap of the secondary of transformer 24.

The manner in which the ring demodulator circuit functions to extract the difference frequency will now be described. Let us assume that at a given moment the dot end of transformer 20 is positive relative to the unmarked end thereof. This means that the voltage developed across the secondary of transformer 20 is dropped equally across diodes 30 and 31 because of their balanced forward impedance. Therefore the voltage at the junction of diodes 30 and 31 is equal to the voltage at the center tap of transformer 20; i.e. is ground potential. Therefore the unmarked end of the secondary of transformer 24 is also at ground potential because it is connected over a low impedance wire directly to the junction of diodes 30 and 31. Now, if the dot end of transformer 24 happens to be positive relative to its unmarked end at this same time, this means that the center tap of transformer 24 will be positive relative to ground by an amount equal to half the voltage developed across the secondary of transformer 24. Thus, we see that when the dot end of both transformers 20 and 24 are driven positive simultaneously a positive output voltage is developed at the center tap of transformer 24.

Now, if we assume that the dot end of transformer 20 is still positive relative to its unmarked end, but that the dot end of transformer 24 is negative relative to its unmarked end, we see that the polarity of the output is reversed. That is, the unmarked end of the secondary of transformer 24 is still at ground potential, but now the dot end is driven negative relative to ground. Therefore the output voltage available at the center tap of transformer 24 is negative to ground by an amount equal to half the voltage developed across the secondary of this transformer.

Thus we see that, at least for positive voltages at the dot end of transformer 20, when the voltages developed at the dot ends of both transformers are in phase, then the output voltage at the center tap of transformer 24 is positive relative to ground. Conversely, when the voltages at the dot ends of the transformer are 180 degrees out of phase, then the output voltage is negative to ground.

Without going into further detail, it suffices to say that a moment's consideration by the reader, making the same sort of analysis, will demonstrate that when the voltage at the dot end of transformer 20 is negative the same rule holds, i.e. when the voltages at the dot ends of the transformers 20 and 24 are in phase the output at the center tap of transformer 24 is positive, and when they are out of phase the output is negative.

FIG. 2 shows the results of this circuit operation when a square wave of 2,000 cycles per second is applied to transformer 20 and a square wave of 3,000 cycles per second is applied to transformer 24. Waveform 2A shows the two thousand cycle square wave which reaches point A in FIG. 1. Waveform 2B shows the three thousand cycle square wave which reaches point B in the circuit of FIG. 1. The resulting output voltage available at point C in the circuit of FIG. 1 is shown in waveform 2C. Waveform C goes positive whenever waveforms A and B are in phase, and negative whenever waveforms A and B are out of phase. FIG. 2 shows that in a three millisecond time interval waveform C goes through three full cycles; i.e. it has a fundamental frequency of 1,000 cycles per second, which is the difference frequency between the two inputs of 3,000 cycles per second and 2,000 cycles per second.

Now that the difference between the frequency of oscillators 10 and 12 has been extracted, it is only necessary to determine what that difference frequency is, and we will then have an indication of the value of the signal voltage $E_S$. If the oscillators 10 and 12 are magnetic multivibrators of the type mentioned above, their square wave outputs will result in an output at point C which has a rectangular pulse waveform. The frequency of such a waveform can be directly determined by counting the number of pulses only if the waveshape has no more than one pulse per cycle. The output of this diode ring will contain no more than one rectangular pulse per cycle only if the two waveforms at points A and B have frequencies which bear an integral multiple relationship to each other and are exactly in phase. If the two frequencies do not have an integral multiple relationship, or if they do have such a relationship but are not exactly in phase, then the rectangular pulse output at point C will contain more than one pulse per cycle as seen in FIG. 2.

However, the fundamental frequency of the output at point C will always be exactly equal to the difference between the two frequencies at points A and B, and the various other higher frequency components which may also be present in the output can be ignored.

For this reason, before the frequency can be reliably determined by counting pulses, the output at point C must be applied to the tunable low-pass filter 40 to pass only the fundamental difference frequency and block all higher harmonic components. In operating the circuit of this invention, the low-pass filter 40 is tuned up from zero frequency until an A.C. voltmeter 50 shows its first relative maximum. At that point, the operator can be sure that the low-pass filter 40 is tuned to the fundamental frequency of the output at point C.

At this point the fundamental frequency can be measured by applying it to a Schmitt trigger 60 which converts the sinusoidal output of filter 40 into a one-pulse-per-cycle square wave having a repetition rate equal to the filter output frequency. The Schmitt trigger output can then be applied to an output counter 62 which counts the number of pulses in the Schmitt output, thus determining the number of cycles in the output, over a measured interval of time. The result of this counting operation may be displayed on any convenient form of read-out device 64. The output counter 62 may be any well-known form of electronic circuit, such as a flip-flop ring counter, while the read-out device 64 may be any appropriate known type of display such as a Nixie tube circuit or a monogram or segmented read-out device employing a diode encoding matrix.

The measured time interval during which the Schmitt trigger pulses are counted is achieved by keeping an output and-gate 70 open for the desired amount of time. This time interval is measured by another counter 72 which may be of any known type, such as the counter described in U.S. Patent 2,897,380 of Neitzert, which is assigned to the assignee of this invention. In order to take a reading the operator applies a read command pulse to lead 80 to set a flip-flop 82 and thus start the measured time interval. The set output of the flip-flop 82 enables the output and-gate 70. It also enables a time-measuring and-gate 84 which allows pulses from the oscillator 10 to pass into the time-measuring counter 72. With the counter 72 receiving pulses at a fixed repetition rate from oscillator 10, a fixed period of time will be required for the counter 72 to fill up. When the counter does fill up, it produces an output which resets the flip-flop 82 and thus disables the output and-gate 70 to terminate the measured time interval during which Schmitt trigger pulses are passed to the output counter 62. The resetting of the flip-flop 82 also disables the time-measuring gate 84 so as to prevent the time-measuring counter 72 from receiving any more pulses. If the time-measuring counter 72 is of the type described in the Neitzert patent mentioned above, it automatically resets itself to the zero condition upon producing its output, and thus needs no special resetting operation. After the reading is taken a clear-input may be applied to a lead 90 to restore the output counter 62 to its zero condition.

The variable phase shift circuit 22 is included merely to take care of the situation which occurs when the signal voltage $E_s$ is equal to zero. In that case, the frequency of the variable oscillator 12 will be equal to the frequency of the reference oscillator 10. Under these circumstances, the operation of the ring demodulator circuit 30 through 33 is such that if the outputs of the two oscillators are 180 degrees out of phase, the output voltage at point C will be a steady D.C. voltage of zero relative to ground. If the two oscillators 10 and 12 are exactly in phase, the resulting output voltage at point C will be a steady D.C. voltage equal to one-half the output developed across the secondary of transformer 24, and this D.C. voltage will not cause any output to appear across the low pass filter 40. However, if the oscillators 10 and 12 are somewhere between zero and one hundred eighty degrees out of phase, the modulation products generated by the ring circuit 30 through 33 include a rectangular pulse waveform having a repetition rate of eight times the frequency of oscillators 10 and 12. This alternating voltage will cause an output across the low pass filter 40 having a fundamental frequency of $8f_1$. As a result, the circuit will give an erroneous indication that there is a difference between the frequencies of oscillators 10 and 12 and that therefore the voltage $E_s$ is greater than zero. In order to test for this erroneously indicating condition, it is only necessary to tune the variable phase shift circuit 22 over a range of at least 90 degrees.

This will serve to bring the phases of the outputs of oscillators 10 and 12 into either an in-phase relationship or a 180 degree out-of-phase relationship. When this occurs the voltmeter 50 will indicate a disappearance of the output across the low pass filter 40. Thus, if the filter output can be tuned away by varying the phase shift circuit 22, then the operator knows that the output voltage is a spurious one. If the variable phase shift circuit 22 does not tune the filter output voltage to zero, then the operator knows that the filter output voltage represents a true indication that the value of the signal voltage $E_s$ is greater than zero.

A specific example may be cited to illustrate the accuracy and wide range of this analog-digital converter system. The frequencies illustrated in FIG. 2 are chosen principally for the sake of ease of illustration, and are not necessarily representative of practical values. To take a somewhat more realistic example, suppose that, when the signal voltage $E_s$ equals zero and the reference voltage $E_o$ equals ten volts, the reference oscillator frequency $f_1$ and the variable oscillator frequency $f_1+f_2$ both equal 10,000 cycles per second (i.e. $f_2=0$). This means that the sensitivity of the system is 10,000 cycles per second divided by 10 volts, or 1,000 cycles per second per volt.

If the value of the signal voltage $E_s$ is now increased to one millivolt, then the reference frequency $f_1$ will still equal 10,000 cycles per second but the variable frequency $f_1+f_2$ will equal 10,001 cycles per second. The resulting difference frequency $f_2$ which represents the one millivolt signal is one cycle per second.

Now suppose that the signal voltage $E_s$ is increased to one volt. The reference frequency $f_1$ remains 10,000 cycles per second, but the variable frequency $f_1+f_2$ increases to 11,000 cycles per second. The difference frequency $f_2$ representing a signal of one volt is then 1,000 cycles per second.

By comparing these two examples it is seen that the value of $E_s$ has been measured over a range of 1,000 to 1 with only a 10% change in the value of the variable oscillator frequency $f_1+f_2$. Furthermore, the fact that each cycle per second variation in the value of the variable frequency $f_2$ represents one millivolt of signal $E_s$, gives the system high resolution and millivolt sensitivity. Furthermore, if only a small excursion of the frequency of the variable oscillator 12 is employed, the variation of its frequency $f_1+f_2$ with changes in voltage $E_s$ can be quite linear. In addition, as mentioned previously, any change in the frequency of the oscillators 10 and 12 due to variations in ambient temperature or changes in the reference supply voltage $E_o$ would tend to affect both oscillators equally. As a result, the difference frequency $f_2$ which represents the signal voltage $E_s$ would not be seriously effected. Thus the system of this invention is inherently compensated for temperature and voltage effects. When these factors are considered in conjunction with the simplicity and low cost of the ring demodulator circuit described herein, it is seen that this analog-digital converter offers a significant combination of features and advantages.

What has been described is a preferred embodiment and is presently believed to be the best mode of practicing the invention, but it will be clear to those skilled in this art that many modifications may be made without departing from the principles of the invention. Accordingly this description is intended merely as an illustrative example, the broader scope of the invention being stated in the appended claims.

This invention claimed is:

1. An analog-digital converter comprising:
a reference oscillator operating at a reference frequency;
another oscillator operating at a variable frequency which varies as a function of the value of a selected variable quantity;
means for selectively shifting the phase of the output signal of one of said oscillators with respect to the phase of the output signal of the other of said oscillators;
a diode ring demodulator circuit connected to both of said oscillators to produce an output comprising a frequency equal to the difference between said variable frequency and said reference frequency;
and means connected for counting the number of cycles of said difference frequency occurring within a measured time interval.

2. An analog-digital converter comprising:
a reference oscillator and a variable oscillator operating at frequencies dependent upon their respective supply voltages;
a reference voltage source connected to supply said reference oscillator for operation at a reference frequency;
a variable voltage source;
said reference and variable voltage sources being connected to supply the algebraic sum of said reference and variable voltages to said variable oscillator for operation at a frequency which differs from said reference frequency by a difference frequency which is a function of said variable voltage;
a diode ring demodulator circuit connected to both of said oscillators to produce an output comprising said difference frequency;
and means connected for counting the number of cycles of said difference frequency occurring within a measured time interval.

3. An analog-digital converter comprising:
a reference oscillator and a variable oscillator operating at frequencies dependent upon their respective supply voltages;
a reference voltage source connected to supply said reference oscillator for operation at a reference frequency;
a variable voltage source;
said reference and variable voltage sources being connected to supply the algebraic sum of said reference and variable voltages to said variable oscillator for operation at a frequency which differs from said reference frequency by a difference frequency which is a function of said variable voltage;
a ring demodulator circuit including a balanced diode bridge connected in a unidirectional ring configuration and connected to both of said oscillators to produce an output comprising a fundamental frequency equal to said difference frequency;
and means connected for counting the number of cycles of said difference frequency occurring within a measured time interval.

4. An analog-digital converter comprising:
a reference oscillator and a variable oscillator operating at frequencies dependent upon their respective supply voltages;
a reference voltage source connected to supply said reference oscillator for operation at a reference frequency;
a variable voltage source;

said reference and variable voltage sources being connected to supply the algebraic sum of said reference and variable voltages to said variable oscillator for operation at a frequency which differs from said reference frequency by a difference frequency which is a function of said variable voltage;
a ring demodulator circuit including:
a first impedance connected across the output of said reference oscillator;
a second impedance connected across the output of said variable oscillator;
a balanced diode bridge connected in a unidirectional ring configuration;
a first pair of opposite corners of said bridge being connected across said first impedance, and the remaining corners of said bridge being connected across said second impedance;
respective center taps connected to said impedances whereby an output is developed between said center taps comprising a fundamental frequency equal to said difference frequency;
and means connected for counting the number of cycles of said difference frequency occurring within a measured time interval.

5. An analog-digital converter comprising:
a reference oscillator and a variable oscillator operating at frequencies dependent upon their respective supply voltages;
a reference voltage source connected to supply said reference oscillator for operation at a reference frequency;
a variable voltage source;
said reference and variable voltage sources being connected to supply the algebraic sum of said reference and variable voltages to said variable oscillator for operation at a frequency which differs from said reference frequency by a difference frequency which is a function of said variable voltage;
a ring demodulator circuit including:
a first impedance connected across the output of said reference oscillator;
a second impedance connected across the output of said variable oscillator;
a balanced diode bridge connected in a unidirectional ring configuration;
a first pair of opposite corners of said bridge being connected across said first impedance, and the remaining corners of said bridge being connected across said second impedance;
respective center taps connected to said impedances whereby an output is developed between said center taps comprising a fundamental frequency equal to said difference frequency;
an output counter for counting the number of cycles in said output;
an and-gate connected to gate said output to said output counter;
and means for enabling said gate for a measured time interval.

6. An analog-digital converter comprising:
a reference oscillator and a variable oscillator operating at frequencies dependent upon their respective supply voltages;
a reference voltage source connected to supply said reference oscillator for operation at a reference frequency;
a variable voltage source;
said reference and variable voltage sources being connected to supply the algebraic sum of said reference and variable voltages to said variable oscillator for operation at a frequency which differs from said reference frequency by a difference frequency which is a function of said variable voltage;
a ring demodulator circuit including:

a first transformer connected to be driven by said reference oscillator;

a second transformer connected to be driven by said variable oscillator;

a balanced diode bridge connected in a unidirectional ring configuration;

a first pair of opposite corners of said bridge being connected across said first transformer secondary, and the remaining corners of said bridge being connected across said second transformer secondary;

respective center taps connected to said secondaries whereby an output is developed between said center taps comprising a fundamental frequency equal to said difference frequency;

an output counter for counting the number of cycles in said output;

an and-gate connected to gate said output to said output counter;

and means for enabling said gate for a measured time interval.

7. An analog-digital converter comprising:

a reference oscillator and a variable oscillator operating at frequencies dependent upon their respective supply voltages;

a reference voltage source connected to supply said reference oscillator for operation at a reference frequency;

a variable voltage source;

said reference and variable voltage sources being connected to supply the algebraic sum of said reference and variable voltages to said variable oscillator for operation at a frequency which differs from said reference frequency by a difference frequency which is a function of said variable voltage;

a ring demodulator circuit including a balanced diode bridge connected in a unidirectional ring configuration and connected to both of said oscillators to produce an output comprising a fundamental frequency equal to said difference frequency;

a low pass filter connected to said ring demodulator output and tunable to pass only said fundamental difference frequency;

means connected to square the waveform of the output of said filter;

an output counter for counting the number of cycles in said squared output;

an output and-gate connected to gate said squared output to said output counter;

and means for enabling said output gate for a measured time interval.

8. An analog-digital converter comprising:

a reference oscillator and a variable oscillator operating at frequencies dependent upon their respective supply voltages;

a reference voltage source connected to supply said reference oscillator for operation at a reference frequency;

a variable voltage source;

said reference and variable voltage sources being connected to supply the algebraic sum of said reference and variable voltages to said variable oscillator for operation at a frequency which differs from said reference frequency by a difference frequency which is a function of said variable voltage;

a ring demodulator circuit including a balanced diode bridge connected in a unidirectional ring configuration and connected to both of said oscillators to produce an output comprising a fundamental frequency equal to said difference frequency;

a low pass filter connected to said ring demodulator output and tunable to pass only said fundamental difference frequency;

a voltmeter connected for indicating when the output of said filter is at a relative maximum;

means connected to square the waveform of the output of said filter;

an output counter for counting the number of cycles in said squared output;

an output and-gate connected to gate said squared output to said output counter;

and means for enabling said output gate for a measured time interval.

9. An analog-digital converter comprising:

a reference oscillator and a variable oscillator operating at frequencies dependent upon their respective supply voltages;

a reference voltage source connected to supply said reference oscillator for operation at a reference frequency;

a variable voltage source;

said reference and variable voltage sources being connected to supply the algebraic sum of said reference and variable voltages to said variable oscillator for operation at a frequency which differs from said reference frequency by a difference frequency which is a function of said variable voltage;

a ring demodulator circuit including a balanced diode bridge connected in a unidirectional ring configuration and connected to both of said oscillators to produce an output comprising a fundamental frequency equal to said difference frequency;

an adjustable phase shifter connected to vary the phase of one oscillator input to said diode bridge relative to the other oscillator input thereto;

a low pass filter connected to said output and tunable to pass only said fundamental difference frequency;

a voltmeter connected for indicating when the output of said filter is at a relative maximum;

means connected to square the waveform of the output of said filter;

an output counter for counting the number of cycles in said squared output;

an output and-gate connected to gave said squared output to said output counter;

and means for enabling said output gate for a measured time interval.

10. An analog-digital converter comprising:

a reference oscillator and a variable oscillator operating at frequencies dependent upon their respective supply voltages;

a reference voltage source connected to supply said reference oscillator for operation at a reference frequency;

a variable voltage source;

said reference and variable voltage sources being connected to supply the algebraic sum of said reference and variable voltages to said variable oscillator for operation at a frequency which differs from said reference frequency by a difference frequency which is a function of said variable voltage;

a ring demodulator circuit including a balanced diode bridge connected in a unidirectional ring configuration and connected to both of said oscillators to produce an output comprising a fundamental frequency equal to said difference frequency;

a low pass filter connected to said output and tunable to pass only said fundamental difference frequency;

means connected to square the waveform of the output of said filter;

an output counter for counting the number of cycles in said squared output;

an output and-gate connected to gate said squared output to said output counter;

and means for enabling said output gate for a measured time interval, including:

a time-measuring counter which counts to a selected number and thereupon produces an output;

a time-measuring and-gate connected for gating the output of said reference oscillator into said time-measuring counter;

and bistable means connected to enable both of said gates when set whereby to define said measured time interval;

said time-measuring counter being connected for said output thereof to reset said bistable means whereby to end said measured time interval after counting said selected number of cycles of said reference oscillator.

References Cited

UNITED STATES PATENTS

| | | | |
|---|---|---|---|
| 2,975,411 | 3/1961 | Hanson | 340—347 |
| 3,007,149 | 10/1961 | Brown | 340—347 |
| 3,167,706 | 1/1965 | Doyle | 324—.5 |

| | | | |
|---|---|---|---|
| 3,294,958 | 12/1966 | DuVall | 235—92 |
| 3,327,135 | 6/1967 | Robb | 307—88.5 |

OTHER REFERENCES

Taylor, IBM Technical Disclosure Bulletin, No. 10, pp. 128–129, March 1961.

Walston & Miller, Transistor Circuit Design, 169–71, 1963.

MAYNARD R. WILBUR, *Primary Examiner.*

DARYL W. COOK, *Examiner.*

J. WALLACE, G. EDWARDS, *Assistant Examiners.*